R. T. WILLIAMS.
SHOCK ABSORBER.
APPLICATION FILED DEC. 8, 1913.
1,096,279.
Patented May 12, 1914.
2 SHEETS—SHEET 2.
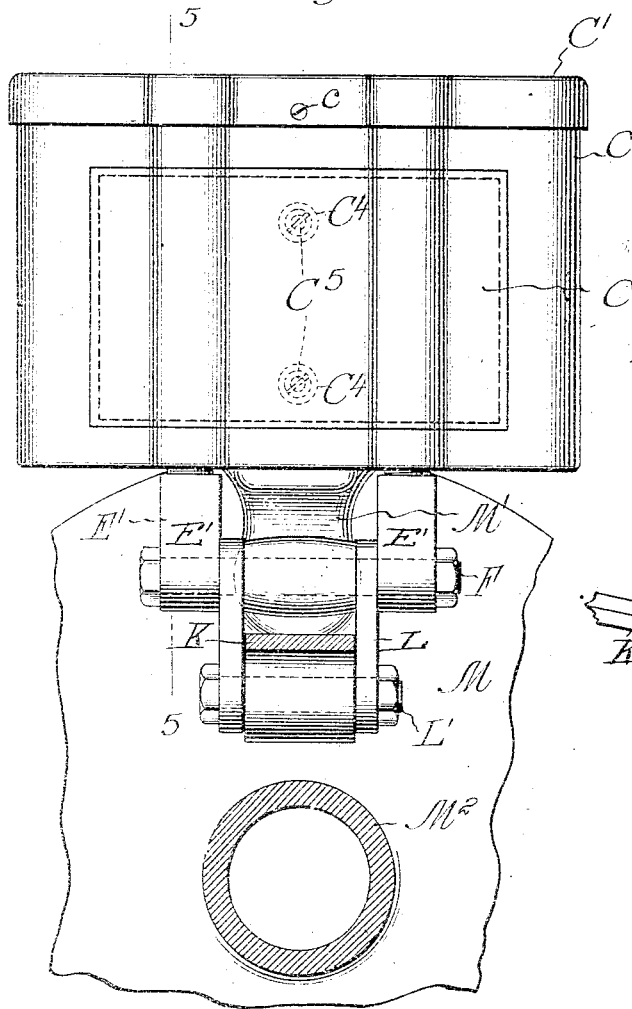
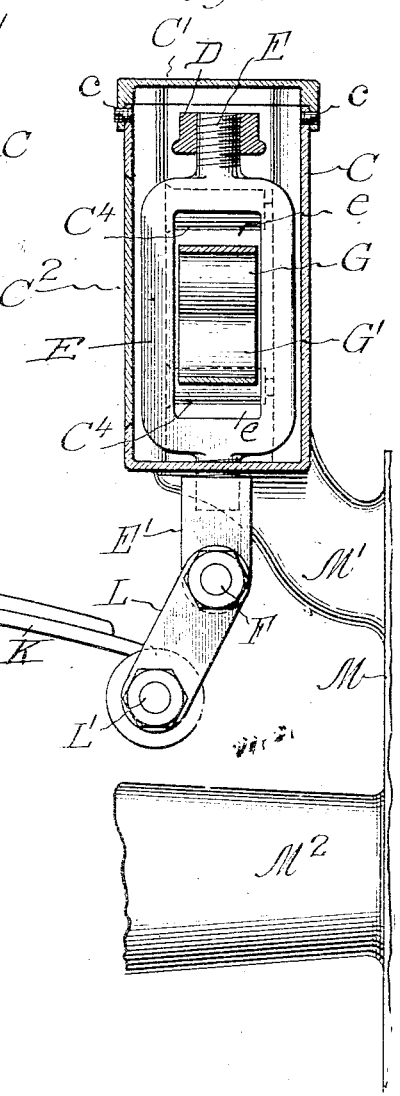
Witnesses
Inventor
Robert T. Williams
By S. E. Thomas
Attorney

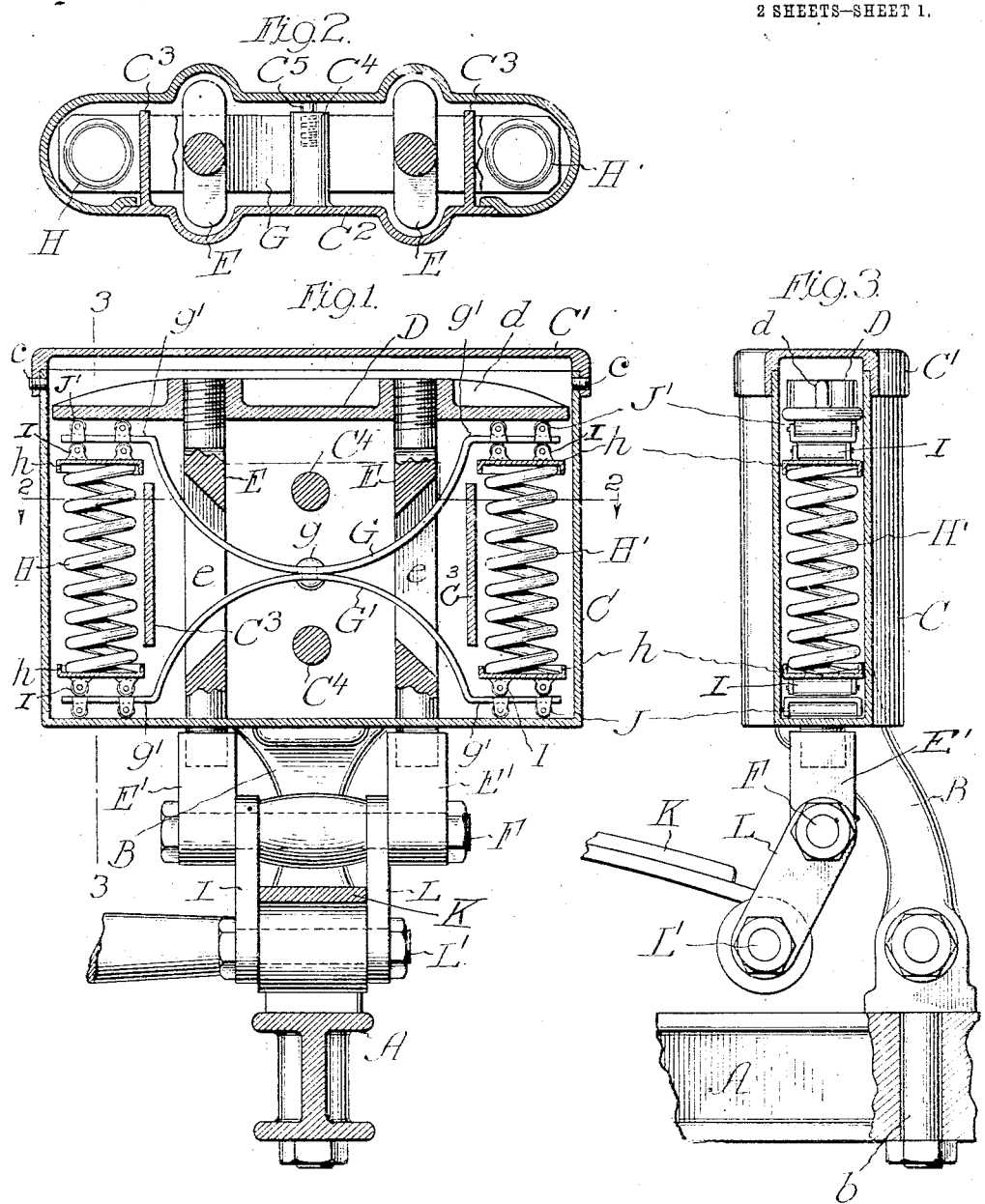

UNITED STATES PATENT OFFICE.

ROBERT T. WILLIAMS, OF DETROIT, MICHIGAN.

SHOCK-ABSORBER.

1,096,279.

Specification of Letters Patent.

Patented May 12, 1914.

Application filed December 8, 1913. Serial No. 805,315.

*To all whom it may concern:*

Be it known that I, ROBERT T. WILLIAMS, citizen of the United States, residing at Detroit, county of Wayne, State of Michigan, have invented a certain new and useful Improvement in Shock-Absorbers, and declare the following to be a full, clear, and exact description of the same, such as will enable others skilled in the art to which it pertains to make and use the same, reference being had to the accompanying drawings, which form a part of this specification.

My invention relates to shock absorbers for vehicles shown in the accompanying drawings and more particularly pointed out in the following specification and claims.

One object of my invention is to provide a simple, cheap and effective shock absorber which may be employed in connection with any motor driven vehicle but which is especially designed for use on the so called "Ford" car.

Another feature of the invention consists in inclosing the resilient elements of the device within a tight fitting case which may be charged with a suitable dope or other lubricant.

Another feature of the invention consists in its adaptability for attachment to a motor driven vehicle without change or alteration of the latter.

Another feature is the ease with which any part of the device may be removed and replaced in case of accident.

Other advantages and improvements will hereafter appear.

In the drawings accompanying this specification:—Figure 1 is a longitudinal vertical section through the device with parts in elevation, showing it mounted upon the axle of a vehicle and connected with its spring, a fragmentary portion of which is shown. Fig. 2 is a horizontal section through the device on line 2—2 of Fig. 1 looking in the direction of the arrows. Fig. 3 is a vertical cross-sectional view of the device on line 3—3 of Fig. 1 with parts in elevation. Fig. 4 is a side elevation of the device connected to a brake drum,—a fragmentary portion of which and of the rear axle of a vehicle is shown. Fig. 5 is a cross-sectional view on line 5—5 of Fig. 4 with parts in elevation.

Referring now to the letters of reference placed upon the drawings:—A indicates the front axle of the vehicle, B, a bracket secured to the axle by a bolt $b$ or other suitable engaging device.

C, is a box or case in turn mounted upon the bracket B and secured thereto.

C' is a removable cover for the case secured thereto by screws $c$.

D denotes a member, housed within the case C reinforced by suitable stiffening ribs $d$, from which extend downwardly a pair of looped bolts E, the lower ends of which project through the bottom of the case, the end of each bolt being threaded to receive a head E', pierced for the passage of a bolt F.

G and G' are semi-elliptical springs lodged within the case connected together by a bolt $g$, the ends of the springs being bent parallel with the top and bottom of the case. The bolts E are looped at $e$, around the springs G and G'—the looped portion being of sufficient length to permit the free action of the springs.

H and H' indicate a pair of coil springs, provided respectively at the top and bottom with caps $h$, to receive the ends of the springs.

I, are anti-friction rolls bearing on the ends of the springs G and G', journaled in bearings carried by the caps $h$.

J are anti-friction rolls bearing upon the bottom of the case C, journaled in bearings carried by the springs G'. J' are similar anti-friction rolls bearing against the inside of the plate D, journaled in bearings carried by the springs G. If desired suitable ball bearings may be employed instead of the several sets of anti-friction rolls indicated in the drawings.

C² is a removable plate forming a portion of the side wall of the case provided with inwardly projecting partition walls C³, designed to protect the respective springs H and H' against accidental displacement.

C⁴, C⁴ are studs projecting inwardly from the removable door or plate C², tapped to receive the screws C⁵ projecting through holes in the opposing wall of the case, by which the door C² is secured in position.

K denotes the spring of a vehicle.

L indicates a link connection between the spring K, and the transverse bolt F, engaging the head of the bolts E.

L' indicates a bolt connecting the links L with the spring K.

M is the brake drum case and M', is a bracket projecting upwardly from the brake drum case to support the box C, mounted directly above the rear axle M To provide for a constant and proper lubrication of the friction roll bearings, and to protect the parts from rust the case may be filled with a suitable lubricant if desired.

Having indicated the several parts by reference letters, the operation of the device will now be explained.

It will be noted that the case C, is supported in a fixed relation to the axle,—and in other types of vehicles in fixed relation to some other suitable member thereof. It will thus be apparent that upon the compression of the spring K, as a result of the vehicle traveling over a rough road—the bolts E, and link L, connecting the vehicle spring with the cross member D, will draw the latter downward against the action of the springs G, G′ and H, H′, which, operating in conjunction with the vehicle spring K, serve to absorb the vibration that would otherwise be manifest.

Having thus described my invention, what I claim is:—

1. In combination with the axle or frame of a vehicle and its spring, a device of the character described comprising a frame adapted to be supported in a fixed relation to said axle, a pair of coiled springs spaced apart mounted in the frame, a pair of semi-elliptic springs also mounted in the frame adapted to bear against each other—their ends respectively overlapping the ends of the coiled springs, a cross member adapted to overlap the end of the coiled springs, and means connecting said cross member with the vehicle spring, whereby upon the latter spring being compressed due to the movement of the vehicle, the cross member will be drawn downward against the action of both the coiled and semi-elliptic springs.

2. A device of the character described comprising a box adapted to be supported in fixed relation to a member of a vehicle, a pair of coiled springs spaced apart within the box, a pair of semi-elliptic springs located within the box assembled in reversed order and bearing against each other, the ends of said springs overlapping the upper and lower ends of the coiled springs, whereby they may act in unison, a movable cross member adapted to act upon the springs within the box to compress the latter, and means connecting said movable cross member with the spring of the vehicle.

3. A device of the character described comprising a box adapted to be supported in a fixed relation to a member of a vehicle, a pair of coiled springs spaced apart within the box, a pair of semi-elliptic springs located within the box assembled in reverse order and bearing against each other, their ends overlapping the ends of the coiled springs, caps covering the ends of said coiled springs, suitable anti-friction rolls between said caps and the ends of the semi-elliptic springs, a movable cross member overlapping the ends of the springs to compress the latter, anti-friction rolls between the ends of the upper semi-elliptic spring and the movable cross member and also between the lower semi-elliptic spring and the bottom of the box, suitable bolts engaging the cross member projecting through openings in the bottom of the box, and a link connection adapted to connect the bolts with the spring of a vehicle.

4. A device of the character described comprising a box adapted to be supported by a member of a vehicle, a pair of coiled springs spaced apart within the box, an arc-shaped spring having its ends bent parallel to the top of the box and overlapping the ends of the coil springs, whereby it may act in unison with the coiled springs, caps covering the ends of the coiled springs, anti-friction bearings between the caps and the ends of the arc-shaped springs, a movable cross member adapted to act upon the springs within the box to compress the latter, and means connecting said movable cross member with the spring of the vehicle.

5. A device of the character described comprising a box adapted to be supported by a member of a vehicle, a pair of coiled springs spaced apart within the box, a pair of arc-shaped springs located within the box assembled in reversed order and bearing against each other, the ends of said springs bent to overlap the upper and lower ends of the coiled springs, whereby they may act in unison, a movable cross member adapted to act upon the springs within the box to compress the latter, bolts connected with the movable cross member and looped around the arc shaped springs the end of the bolts projecting through the bottom of the box, and a link connection between the end of the bolts and the vehicle spring.

6. A device of the character described comprising a box adapted to be supported in fixed relation to a member of a vehicle, a pair of coiled springs spaced apart within the box, a pair of arc-shaped springs having their ends bent parallel to the top and bottom of the box to overlap the ends of the coil springs whereby the springs may act in unison, anti-friction bearings between the ends of the arc-shaped springs and the ends of the coiled springs, a movable member adapted to act upon the springs within the box, and means for connecting said movable member with the spring of a vehicle.

7. A device of the character described comprising a box adapted to be supported in fixed relation to a member of a vehicle, a pair of coiled springs spaced apart within the box, a pair of arc-shaped springs having their ends bent parallel to the top and bottom of the box to overlap the ends of the coil springs whereby the springs may act in unison, anti-friction bearings between the ends of the arc-shaped springs and the ends of the coiled springs, a movable member adapted to act upon the springs within the box, and a removable wall for said box provided with inwardly projecting partition walls adapted to partially inclose the coiled springs, whereby they may be insured against accidental displacement.

In testimony whereof, I sign this specification in the presence of two witnesses.

ROBERT T. WILLIAMS.

Witnesses:
SAMUEL E. THOMAS,
CHRISTINE MALETIN.